United States Patent
Park

(10) Patent No.: US 9,815,422 B2
(45) Date of Patent: Nov. 14, 2017

(54) POWER CONNECTION BOX FOR HYBRID VEHICLE

(71) Applicant: Tyco Electronics AMP Korea Ltd., Kyungsangbuk-Do (KR)

(72) Inventor: Young Geun Park, Kyungsangbuk-Do (KR)

(73) Assignee: Tyco Electronics AMP Korea Ltd., Kyungsangbuk-Do (KR)

( * ) Notice: Subject to any disclaimer, the term of this patent is extended or adjusted under 35 U.S.C. 154(b) by 614 days.

(21) Appl. No.: 14/152,501

(22) Filed: Jan. 10, 2014

(65) Prior Publication Data

US 2014/0125123 A1    May 8, 2014

Related U.S. Application Data

(63) Continuation of application No. PCT/KR2012/004718, filed on Jun. 15, 2012.

(30) Foreign Application Priority Data

Jul. 12, 2011 (KR) ................. 10-2011-0068947

(51) Int. Cl.
*B60R 16/023* (2006.01)

(52) U.S. Cl.
CPC ........ *B60R 16/023* (2013.01); *B60R 16/0238* (2013.01)

(58) Field of Classification Search
None
See application file for complete search history.

(56) References Cited

U.S. PATENT DOCUMENTS

| | | | |
|---|---|---|---|
| 4,852,147 A | 7/1989 | Suzuki et al. | |
| 6,975,091 B2 | 12/2005 | Lee et al. | |
| 7,890,227 B2 | 2/2011 | Sayama et al. | |
| 8,159,184 B2 | 4/2012 | Emori et al. | |
| 2008/0050645 A1* | 2/2008 | Kai ................. | B60L 11/1861 429/61 |

(Continued)

FOREIGN PATENT DOCUMENTS

| | | |
|---|---|---|
| CN | 201320968 Y | 10/2009 |
| CN | 201405807 Y | 2/2010 |
| EP | 0944154 A2 | 9/1999 |

(Continued)

OTHER PUBLICATIONS

Chinese Office Action, dated Jul. 15, 2015, 6 pages.

(Continued)

*Primary Examiner* — Jeffrey Shin
(74) *Attorney, Agent, or Firm* — Barley Snyder

(57) ABSTRACT

A power connection box is disclosed for a hybrid vehicle and includes a current supply member and a lead line installation member. The current supply member has a first main relay, a second main relay, a bus bar, and a preliminary relay. The bus bar is connected to the first main relay and has a side connected to a battery and an opposite side connected to an inverter. The preliminary relay is positioned between the first main relay and the bus bar connected to the first main relay. The lead line installation member has a plurality of lead lines connected to the first main relay, the second main relay, and the preliminary relay.

7 Claims, 3 Drawing Sheets

(56) References Cited

U.S. PATENT DOCUMENTS

2010/0130033 A1* 5/2010 Lee .................... B60R 16/0238
439/76.2
2012/0087064 A1* 4/2012 Kwon .................. B60L 3/0069
361/643

FOREIGN PATENT DOCUMENTS

| JP | 11252825 A | 9/1999 |
|----|------------|--------|
| KR | 10-2010-0005746 | 1/2010 |
| KR | 10-2011-0001012 | 1/2011 |

OTHER PUBLICATIONS

English Translation of Chinese Office Action, dated Jul. 15, 2015, 6 pages.
Abstract of JP 11252825A, dated Sep. 17, 1999, 1 page.
Abstract of CN 201320968(Y), dated Oct. 7, 2009, 1 page.
Abstract of CN 201405807(Y), dated Feb. 17, 2010, 1 page.
International PCT Search Report of co-pending International Application PCT/KR2012/004718, 2 pages dated Dec. 6, 2012.

\* cited by examiner

Prior Art

POWER CONNECTION BOX FOR HYBRID VEHICLE

CROSS-REFERENCE TO RELATED APPLICATIONS

This application is a continuation of PCT International Application No. PCT/KR2012/004718 filed Jun. 15, 2012, which claims priority under 35 U.S.C. §119 to KR Patent Application No.: 10-2011-0068947, filed Jul. 12, 2011.

FIELD OF THE INVENTION

The invention is generally related to a power connection box, and more specifically to a power connection box that receives high current and transfers the high current into the hybrid vehicle.

BACKGROUND

A hybrid vehicle employs at least two power sources for motive power. The hybrid vehicle refers to a next generation vehicle which represents more improved fuel efficiency as compared with existing vehicles by significantly reducing the weight of the body thereof to minimize air resistance, and by significantly reducing the emissions of greenhouse and noxious gases.

An exemplary hybrid vehicle employs an existing internal combustion engine and an electric motor driven through a battery. Generally the battery is recharged by using energy generated by the internal combustion engine or by energy generated during braking. The recharged battery is reused when driving the vehicle.

Generally, hybrid vehicles have higher fuel efficiency compared to typical vehicles employing only the internal combustion engine, so that the hybrid vehicle is attractive to the public in an era of government mandated CO2 emission limits and high oil prices.

FIG. 4 is a schematic view showing a conventional power connection box for a hybrid vehicle. A battery 5, charged by a power generator 3 mechanically coupled with an engine 1, is connected to an inverter 7. DC current input from the battery 5 is converted into an AC current through a switching operation of the inverter 7 to supply the AC current to the motor 3.

Two relays 2a and 2b are interposed between the inverter 7 and the battery 5, so that the battery 5 may be connected to or disconnected from the inverter 7 through a key manipulation of a vehicle. A preliminary relay 4a series-connected to a preliminary resistor 4 is provided in a power relay assembly connected between the battery 5 and the inverter 7, so that the preliminary relay 4a is connected to the main relays 2a and 2b.

When the main relays 2a and 2b are closed, and the preliminary relay 4a is switched off when the vehicle is driven, so that the power of the battery 5 is applied to the inverter 7.

If the vehicle is stopped and the vehicle key is turned off, the main relays 2a and 2b are opened. Consequently the battery 5 becomes disconnected from the inverter 7, so that the power of the battery 5 is prevented from being transferred to the motor 3 through the inverter 7.

A capacitor 9 is connected to the inverter 7 in parallel to attenuate voltage fluctuation so that rectified current is input to the inverter 7, allowing the inverter 7 to be stably operated.

When the vehicle key is turned on and the vehicle is driven again, the preliminary relay 4a is closed. Then, the voltage of the battery 5, which is dropped by the preliminary resistor 4, is applied to the inverter 7. The charging of the capacitor 9 connected to the inverter 7 then commences. If the capacitor 9 is sufficiently charged, the main relays 2a and 2b are connected while the preliminary relay 4a is opened, so that the power of the battery 5 is applied to the inverter 7.

The purpose of the process is that the preliminary resistor 4 sharply drops the supplied power of high voltage so that the dropped power can be applied, thereby preventing the electrodes of the main relays 2a and 2b from being damaged or fused.

The power connection box having the above structure includes a plurality of members as described above, and is connected to lead lines of linking the members with each other in order to operate.

The lead lines must be safely protected from the interference with peripheral members in order to stably supply power. However, as the lead lines extend out of the peripheral members, they often become tangled and rub together to cause the damage to each other.

In addition, when trying to perform maintenance for the power connection box, since the lead lines are irregularly tangled together, access to the power connection box is difficult because the lead lines and the peripheral members block accessibility.

In particular, processes of disconnecting lead lines from the members, performing the maintenance of the lead lines, and connecting the lead lines with the members are complicated. Further, in the process of disconnecting the lead lines from the members or connecting the lead lines to the members again, the lead lines may be damaged or connection failure with the lead lines may be caused.

SUMMARY

The invention has been made to overcome the above mentioned problems. It is therefore an object of the invention to provide a power connection box for a hybrid vehicle. The power connection box includes a current supply member and a lead line installation member. The current supply member has a first main relay, a second main relay, a bus bar, and a preliminary relay. The bus bar is connected to the first main relay and has a side connected to a battery and an opposite side connected to an inverter. The preliminary relay is positioned between the first main relay and the bus bar connected to the first main relay. The lead line installation member has a plurality of lead lines connected to the first main relay, the second main relay, and the preliminary relay.

BRIEF DESCRIPTION OF THE DRAWINGS

The invention will now be described by way of example with reference to the accompanying figures, of which.

DETAILED DESCRIPTION

Hereinafter, exemplary embodiments of the invention will be described in more detail with reference to accompanying drawings.

Figure 1:
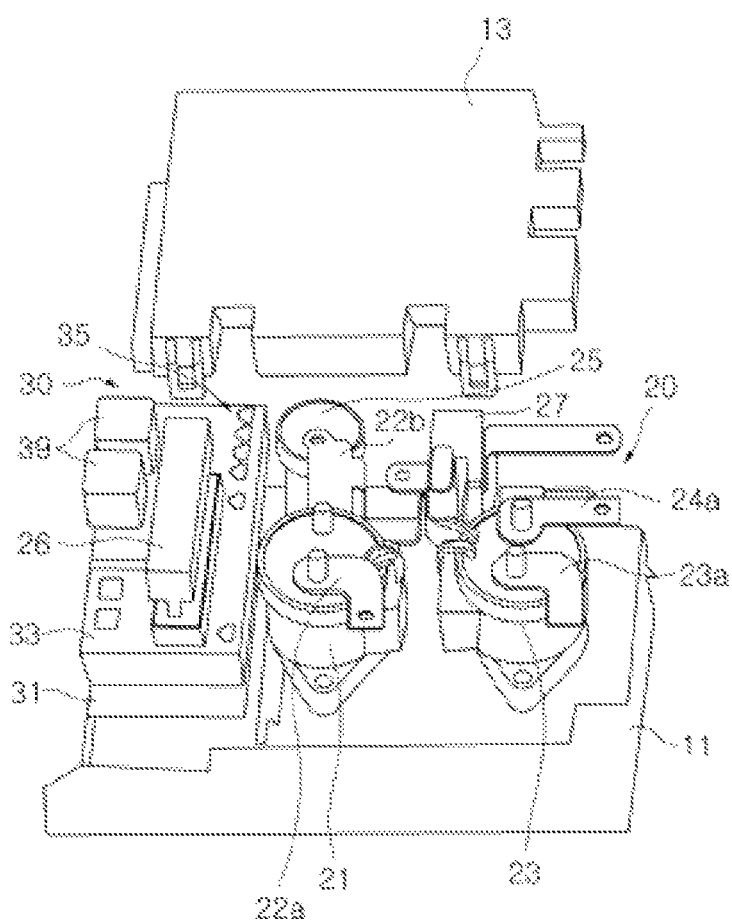
FIG. 1 is an exploded view showing the disassembling of a power connection box for a hybrid vehicle.
Figure 2:
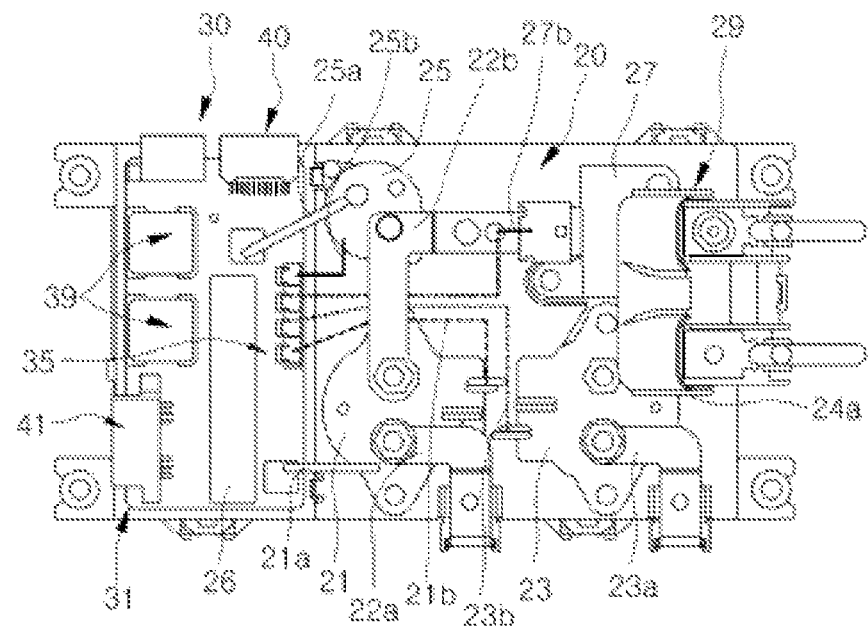
FIG. 2 is a plan view of the power connection box.

As shown in FIGS. 1 and 2, the power connection box for the hybrid vehicle according to the invention connects a battery to an inverter, and receives external power to supply high current having high voltage to the hybrid vehicle. The power connection box includes a current supply member 20, a lead line installation member 30, and a cover 13. The current supply member 20 is positioned on a first side of a body 11, and has relays which maintain a constant voltage from the battery so that the constant voltage is supplied to the inverter. The lead line installation member 30 is positioned on a second side of the body 11 opposite the first side, and has lead lines 21b, 23b, 25b, and 27b connected to the relays. The lead lines 21b, 23b, 25b, and 27b supply operating power to the relays so that the relays are operated. The cover 13 is positioned over an opening of the body 11. The current supply member 20 is provided at first side of the body 11 in such a manner that one side of the current supply member 20 is connected to the battery, and an opposite side of the current supply member 20 is connected to the inverter.

The current supply member 20 includes a first main relay 21 serving as a positive (+) side and a second main relay 23 serving as a negative (−) side. The first main relay 21 is provided on a second side with a first bus bar 22a having a terminal connected to a positive (+) terminal of the battery and the second main relay 23 is provided at a first side with a second bus bar 23a having a terminal connected to a negative (−) terminal of the battery. In addition, the current supply member 20 further includes a preliminary relay 25 connected to the first main relay 21 through a third bus bar 22b. The preliminary relay 25 has one side connected to the third bus bar 22b, and an opposite side connected to a preliminary resistor 26 that will be described later. In addition, the current supply member 20 includes a connector 29 connected to a positive (+) polarity and a negative (−) polarity of the inverter. A positive (+) polarity of the connector 29 is connected to the third bus bar 22b connected to the preliminary relay 25 and a negative (−) polarity thereof is connected to a fourth bus bar 24a. The preliminary relay 25 is provided at one side thereof with a current sensor 27. The current sensor 27 measures current applied from the battery to transfer the measured current value to a controller mounted on a printed circuit board 31, which will be described below, through a plurality of preliminary lead lines, which will be described later, so that the state of the battery can be determined.

The lead line installation member 30 prevents the lead lines, which are used to supply operating power to drive the first and second main relays 21 and 23 and the preliminary relay 25, from being tangled together. The lead line installation member 30 includes the printed circuit board 31, a lead line housing 33 installed below the printed circuit board 31, and a plurality of terminal connection ports 35 formed on the printed circuit board 31 to allow the lead lines to connect to the printed circuit board 31.

The printed circuit board 31 has a circuit pattern electrically connected to the lead lines provided in the terminal connection port 35. The terminal connection port 35 includes a coupling member insertion member that accepts the insertion of a coupling member positioned on an end portion of each lead line (not shown), such that the lead line is electrically connected to the printed circuit board 31.

In other words, the terminal connection port 35 is connected to the coupling member of each lead line in a plug-in type, so that the leads can be simply connected to the terminal connection port 35 or disconnected from the terminal connection port 35 without the damage of the lead lines.

In addition, the printed circuit board 31 is connected to an operating power relay 39 to constantly maintain the voltage of introduced power in order to supply the operating power to each lead line. In addition, since the operating power relay 39 is connected to the printed circuit board 31, the operating power relay 39 is also connected to each lead line through the circuit pattern of the printed circuit board 31.

In addition, as shown in FIG. 2, the preliminary resistor 26 is connected to the printed circuit board 31, and connected to the first main relay 21 and the preliminary relay 25 through preliminary connectors 21a and 25a.

The preliminary resistor 26 is disconnected from main relays when the driving of the vehicle is stopped, and connected to the preliminary relay 25 when the driving of the vehicle is started again. The voltage of the battery dropped by the preliminary resistor 26 is applied to the inverter and charged in the capacitor connected to the inverter. The preliminary resistor 26 is connected to the first main relay 21 through the preliminary connector 21a, and is connected to the preliminary relay 25 through the preliminary connector 25a.

As described above, when the preliminary resistor 26 is installed on the printed circuit board 31, an additional installation space of the preliminary resistor 26 is not required, so that the space can be saved, and the preliminary relay 25 can be simply connected to the preliminary resistor 26 without the interference between lead lines.

In addition, since the first and main relays 21 and 23, the preliminary relay 25, and the current sensor 27 are connected to the printed circuit board 31 by inserting the related lead lines 21b, 23b, 25b, and 27b into the terminal connection ports 35, the lead lines can be prevented from being damaged due to the friction between the lead lines. In addition, the lead lines need not be individually installed or removed. Further, the lead lines can be easily connected to printed circuit board 31 or disconnected from the printed circuit board 31, so that a work of replacing members with new one can be easily performed.

In this case, the printed circuit board 31, the lead line housing 33 mounted on the printed circuit board 31, and the preliminary resistor 26, installed in the lead housing 33 are connected to the circuit patterns of the printed circuit board 31. The printed circuit board 31, the lead line housing 33 mounted on the printed circuit board 31, and the preliminary resistor 26, installed in the lead housing 33 may be connected to the circuit patterns by plug-in connections.

Figure 3:
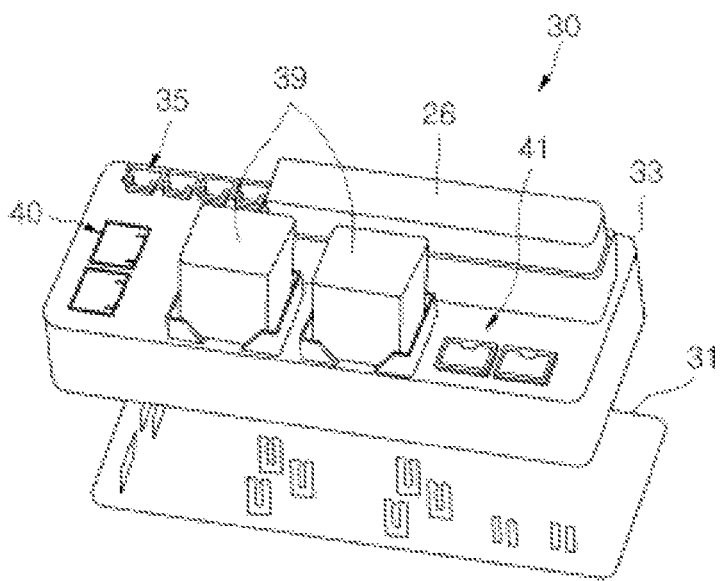
FIG. 3 is a view of a power supply for the power connection box for the hybrid vehicle.
Figure 4:
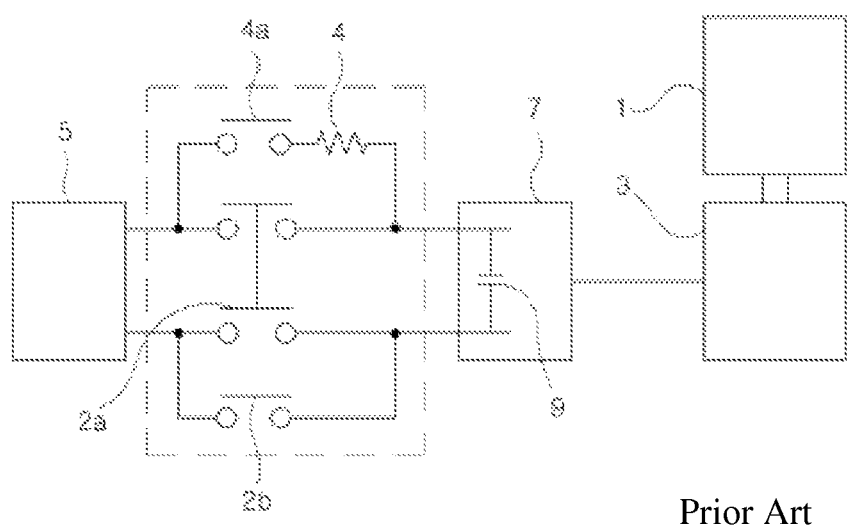
FIG. 4 is a schematic view showing a conventional power connection box for a hybrid vehicle.

In FIG. 3, the operating power relay 39 can apply current having constant voltage to the lead lines 21b, 23b, 25b, and 27b and can apply power to operate a device used for the vehicle through an additional device connector 41, so that the device used for the vehicle can be operated.

Therefore, similarly to the first and second main relays 21 and 23, the operating power relay 39 can supply power through the device connector 41 having the positive (+) polarity and the negative (−) polarity connected to the printed circuit board 31 on which the operating power relay 39 is mounted.

An exemplary device may include a fan used in the hybrid vehicle. The fan may draw the current having lower voltage rather than high voltage differently based on the driving conditions of the vehicle, so the power supplied through the operating power relay 39 to operate the relays is supplied to operate the fan connected to the device connector 41.

A controller 40 connected to the printed circuit board 31 is installed in the lead line housing 33. The controller 40 controls the whole operations of the power connection box, and, especially, controls the operations of the current sensor 27, the current supply member 20, and the lead line installation member 30.

The controller 40 receives information of the current detected by the current sensor 27, and uses this information to control the whole operations of the power connection box.

The current supply member 20 is connected to the controller 40 through the lead lines 21b, 23b, 25b, and 27b connected to the circuit pattern formed in the printed circuit board 31, and the lead line installation member 30 is connected to the controller 40 through the operating voltage relay 39 installed in the printed circuit board 31, so that the operations thereof can be controlled by the controller 40.

Therefore, according to the power connection box of the invention, the lead lines, which are used to supply the relay operating power to drive the relays so that the current introduced from the battery can be supplied to the hybrid vehicle under a constant voltage, are connected to the printed circuit board. Accordingly, the lead lines can be prevented from being tangled together and damaged, and can be simply disconnected from the printed circuit board. Furthermore, the volume of the power connection box can be reduced.

Although an exemplary embodiment of the invention has been described for illustrative purposes, those skilled in the art will appreciate that various modifications, additions and substitutions are possible, without deviating from the scope and spirit of the invention as disclosed in the accompanying claims.

What is claimed is:

1. A power connection box for a hybrid vehicle, comprising:
   a current supply member having
      a first main relay,
      a second main relay,
      a bus bar connected to the first main relay having a side connected to a battery and an opposite side connected to an inverter, and
      a preliminary relay positioned between the first main relay and the bus bar connected to the first main relay; and
   a lead line installation member having
      a lead line housing separate from the current supply member, the battery, and the inverter and positioned between the battery and the inverter,
      a printed circuit board attached to the lead line housing and having a circuit pattern and a plurality of terminal connection ports, and
      a plurality of lead lines each having a first end detachably engageable with the terminal connection ports to connect the lead lines to the circuit pattern and an opposite second end attached to one of the first main relay, the second main relay, and the preliminary relay, the lead lines providing operating power between the circuit pattern and the first main relay, the second main relay, and the preliminary relay.

2. The power connection box of claim 1, wherein the terminal connection ports are a plug-in type ports.

3. The power connection box of claim 1, wherein the printed circuit board includes a preliminary resistor connected with the preliminary relay and the first main relay.

4. The power connection box of claim 1, further comprising:
   an operating power relay provided on the printed circuit board; and
   a device connector provided on a side of the operating power relay.

5. The power connection box of claim 4, further comprising a controller connected to the printed circuit board and disposed in the lead line housing.

6. The power connection box of claim 5, wherein the lead lines are connected to the controller through the operating power relay.

7. The power connection box of claim 1, wherein the bus bar is physically connected between the battery and the first main relay.

* * * * *